(12) United States Patent
Li

(10) Patent No.: US 10,204,257 B2
(45) Date of Patent: Feb. 12, 2019

(54) DISPLAY APPARATUS AND DISPLAY METHOD

(71) Applicant: BOE TECHNOLOGY GROUP CO., LTD, Beijing (CN)

(72) Inventor: Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 13 days.

(21) Appl. No.: 15/108,587

(22) PCT Filed: Dec. 28, 2015

(86) PCT No.: PCT/CN2015/099129
§ 371 (c)(1),
(2) Date: Jun. 28, 2016

(87) PCT Pub. No.: WO2017/012273
PCT Pub. Date: Jan. 26, 2017

(65) Prior Publication Data
US 2017/0147861 A1    May 25, 2017

(30) Foreign Application Priority Data

Jul. 23, 2015  (CN) .......................... 2015 1 0437915

(51) Int. Cl.
*G06K 9/00* (2006.01)
*G06F 3/0484* (2013.01)
(Continued)

(52) U.S. Cl.
CPC ....... *G06K 9/00087* (2013.01); *G06F 3/0484* (2013.01); *G06F 3/04883* (2013.01); *G06F 21/32* (2013.01); *G06K 9/00013* (2013.01)

(58) Field of Classification Search
None
See application file for complete search history.

(56) References Cited

U.S. PATENT DOCUMENTS

2009/0201257 A1* 8/2009 Saitoh ..................... G06F 1/162
345/173
2010/0220900 A1* 9/2010 Orsley .................. G06F 3/0421
382/124
(Continued)

FOREIGN PATENT DOCUMENTS

CN         102736854 A    10/2012
CN         103076960 A    5/2013
(Continued)

OTHER PUBLICATIONS

The World Intellectual Property Organization (WIPO) International Search Report for PCT/CN2015/099129 dated Apr. 26, 2016.
(Continued)

*Primary Examiner* — Ifedayo B Iluyomade
(74) *Attorney, Agent, or Firm* — Anova Law Group, PLLC

(57) ABSTRACT

In accordance with various embodiments of the disclosed subject matter, a display apparatus and a related display method are provided. In some embodiments, the display apparatus comprises: a display panel; a memory unit for storing user fingerprint information; a fingerprint recognition unit embedded in the display panel for recognizing current fingerprint data of a finger when the finger is sliding on the display panel, and determining a sliding direction of the finger; and a control unit for comparing the current fingerprint data of the finger with the user fingerprint information, and upon matching, controlling a display on the display panel based on the sliding direction of the finger.

10 Claims, 2 Drawing Sheets

(51) Int. Cl.
  *G06F 3/0488*  (2013.01)
  *G06F 21/32*  (2013.01)

(56) References Cited

U.S. PATENT DOCUMENTS

| | | | |
|---|---|---|---|
| 2012/0258773 A1* | 10/2012 | Alvarez Rivera | .... G06F 1/1656 |
| | | | 455/556.1 |
| 2015/0054764 A1 | 2/2015 | Kim et al. | |
| 2015/0062032 A1 | 3/2015 | Xie | |
| 2015/0312508 A1* | 10/2015 | Phang | ...................... H04N 5/45 |
| | | | 348/552 |

FOREIGN PATENT DOCUMENTS

| | | | |
|---|---|---|---|
| CN | 103886237 A | 6/2014 | |
| CN | 104035721 A | 9/2014 | |
| CN | 104700016 A | 6/2015 | |
| CN | 2015088166 A1 | 6/2015 | |
| CN | 105094611 A | 11/2015 | |
| WO | 2006126310 A1 | 11/2006 | |

OTHER PUBLICATIONS

State Intellectual Property Office of the P.R.C (SIPO) Office Action 1 for 201510437915.3 dated Sep. 18, 2017 13 Pages (including translation).
State Intellectual Property Office of the P.R.C (SIPO) Office Action 2 for 201510437915.3 Apr. 13, 2018 16 Pages.

* cited by examiner

DISPLAY APPARATUS AND DISPLAY METHOD

CROSS-REFERENCES TO RELATED APPLICATIONS

This patent application is a national phase entry under 35 U.S.C. § 371 of International Application No. PCT/CN2015/099129, filed on Dec. 28, 2015, which claims priority to Chinese Patent Application No. 201510437915.3 filed on Jul. 23, 2015. The above enumerated patent applications are incorporated by reference herein in their entirety.

TECHNICAL FIELD

The disclosed subject matter generally relates to fingerprint recognition technologies and, more particularly, relates to a display apparatus, and a related display method.

BACKGROUND

In the existing mobile phones and other smart display devices, a fingerprint recognition module is sometimes installed for identifying a fingerprint of a user to authenticating a display unlock operation or a start operation of the display device. However, such a fingerprint recognition operation is only used for a single on-off function, which is not well developed to associate with other functions of the display device.

Accordingly, it is desirable to provide a display apparatus, and a display method to at least partially alleviate one or more problems set forth above and to solve other problems in the art.

BRIEF SUMMARY

In accordance with some embodiments of the disclosed subject matter, a display apparatus, and a related display method are provided.

An aspect of the present disclosure provides a display apparatus. In some embodiments, the display apparatus comprises: a display panel; a memory for storing user fingerprint information; a fingerprint recognition unit embedded in the display panel for recognizing current fingerprint data of a finger when the finger is sliding on the display panel, and determining a sliding direction of the finger; and a controller for comparing the current fingerprint data of the finger with the user fingerprint information, and upon matching, controlling a display on the display panel based on the sliding direction of the finger.

In some embodiments, the controller is configured for controlling the display panel in a first display form when the sliding direction of the finger is a first direction; and the controller is configured for controlling the display panel in a second display form when the sliding direction of the finger is a second direction.

In some embodiments, the display panel comprises a length side and a width side; the first display form comprises displaying in a wide-screen display type by using the length side of the display panel as a bottom side; and the second display form comprises displaying in a narrow-screen display type by using the width side of the display panel as a bottom side.

In some embodiments, the first display form comprises displaying a first content item; and the second display form comprises displaying a second content item that is different from the first content item.

In some embodiments, the first content item comprises at least one video type application; and the second content item comprises at least one document type application.

In some embodiments, the first direction is substantially parallel to the length side of the display panel; and the second direction is substantially parallel to the width side of the display panel.

In some embodiments, the controller is further used for retrieving user information associated with the user fingerprint information that matches the current fingerprint data, and controlling the display on the display panel based on the sliding direction of the finger and the user information.

In some embodiments, the user fingerprint information is associated with a plurality of users.

In some embodiments, the controller is used for controlling the display panel in a third display form, when the sliding direction of the finger is a third direction.

In some embodiments, the fingerprint recognition unit comprises a plurality of fingerprint recognition sensors distributed in a plurality of pixels of the display panel.

In some embodiments, the display apparatus is a handheld display apparatus.

Another aspect of the present disclosure provides a display method, the method can include: recognizing, using a fingerprint recognition unit embedded in a display panel, current fingerprint data of a finger and determining a sliding direction of the finger when the finger is sliding on the display panel; comparing, using a controller, the current fingerprint data of the finger with user fingerprint information stored in a memory; and controlling, using the controller, a display on the display panel based on the sliding direction of the finger when the current fingerprint data of the finger matches the user fingerprint information.

In some embodiments, the display on the display panel is in a first display form when the sliding direction of the finger is a first direction; and the display on the display panel is in a second display form when the sliding direction of the finger is a second direction.

In some embodiments, the display panel comprises a length side and a width side;
the first display form comprises displaying in a wide-screen display type by using the length side of the display panel as a bottom side; and the second display form comprises displaying a narrow-screen display type by using the width side of the display panel as a bottom side.

In some embodiments, the first display form comprises displaying a first content item; and the second display form comprises displaying a second content item that is different from the first content item.

In some embodiments, the first content item comprises at least one video type application; and the second content item comprises at least one document type application.

In some embodiments, the first direction is substantially parallel to the length side of the display panel; and the second direction is substantially parallel to the width side of the display panel.

In some embodiments, the method further comprises: retrieving, using the controller, user information associated with the user fingerprint information that matches the current fingerprint data; and controlling, using the controller, the display on the display panel based on the sliding direction of the finger and the user information.

In some embodiments, the user fingerprint information is associated with a plurality of users.

In some embodiments, the method further comprises controlling, using the controller, the display panel in a third display form, when the sliding direction of the finger is a third direction.

In some embodiments, the fingerprint recognition unit comprises a plurality of fingerprint recognition sensors distributed in a plurality of pixels of the display panel.

In some embodiments, the display apparatus is a handheld display apparatus.

Other aspects of the present disclosure can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the disclosed subject matter, reference will now be made in detail to exemplary embodiments of the disclosed subject matter, which are illustrated in the accompanying drawings. Wherever possible, the same reference numbers will be used throughout the drawings to refer to the same or like parts.

In accordance with various embodiments, the disclosed subject matter provides a display apparatus, and a related display method.

Figure 1:
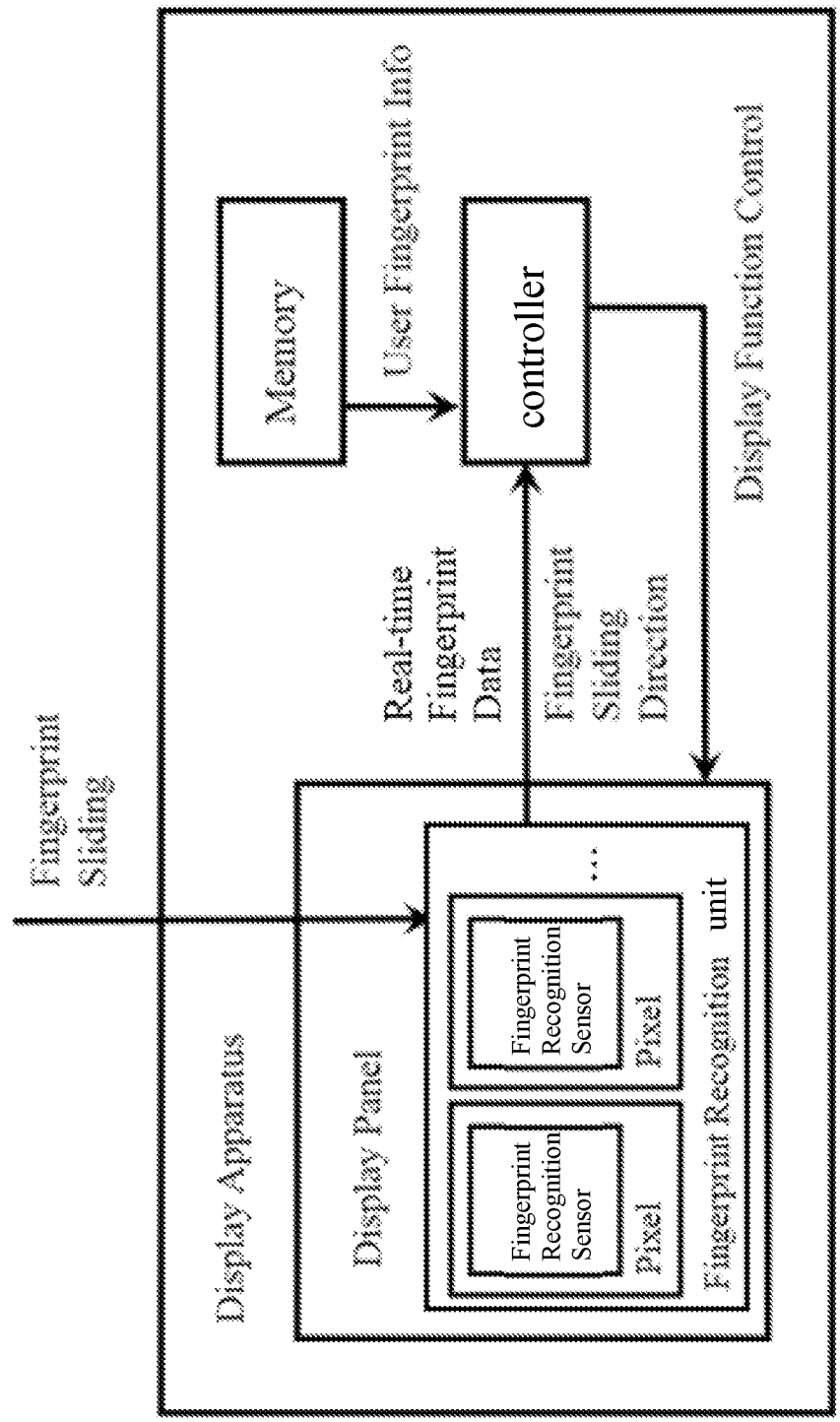
FIG. 1 is a schematic block-diagram of a display apparatus in accordance with some embodiments of the disclosed subject matter.

FIG. 1 shows a schematic block-diagram of a disclosed display apparatus in accordance with some embodiments of the disclosed subject matter. As illustrated, the display apparatus can include a display panel, a memory, a fingerprint recognition unit, and a controller.

The display panel is used for operating a display function. For example, the display panel can be a liquid crystal display (LED) panel, an organic light emitting diode (OLED) display panel, or any other suitable display panel.

The memory can store user fingerprint information. The user fingerprint information can include any suitable information of one or more fingerprints that associated with one or more users of the display apparatus. For example, the user fingerprint information can include one or more images of a fingerprint of a user. As another example, the user fingerprint information can include any feature information of a fingerprint of a user, such as texture data of the fingerprint, shape data of the fingerprint, etc. The memory can be any suitable device that has an information storage function.

Fingerprint recognition unit can be embedded in the display panel. Fingerprint recognition unit is used for recognizing fingerprint data of a finger of a user when the user is sliding the finger on the display panel, and determining a sliding direction of a fingerprint of the finger.

In some embodiments, the display panel can include fingerprint recognition unit integrated therein. For example, the fingerprint recognition unit can include multiple fingerprint recognition sensors distributed in multiple pixels of the display panel, as shown in FIG. 1. When a finger is sliding on the display panel, the multiple fingerprint recognition sensors can collect the fingerprint data (such as texture data of the fingerprint, shape data of the fingerprint, etc.) and can determine a sliding direction of the fingerprint.

The sliding direction of the fingerprint is determined during the sliding process of the fingerprint. And during the same sliding process of the fingerprint, the fingerprint data can be collected synchronously. Sometimes it is difficult to collect enough fingerprint data for identifying a fingerprint when the fingerprint does not move. This is because the patterns of a human fingerprint is very fine, and one the other hand, the fingerprint recognition sensors integrated in the display panel have relatively limited accuracy. Therefore, when a fingerprint is sliding on the display panel, the same pattern of the fingerprint can be detected multiple times by the multiple fingerprint recognition sensors integrated in the display panel. In this case, more fingerprint data can be collected and the fingerprint can be easily identified.

The controller can be used for comparing the collected fingerprint data with the user fingerprint information stored in the memory, and for controlling the display panel to perform the display function based on the sliding direction of the finger in response to a matched result when the fingerprint data matches a record of the user fingerprint information.

The fingerprint recognition unit can send the collected fingerprint data of the sliding fingerprint to the controller. And the controller can use the fingerprint data to compare with the user fingerprint information stored in the memory.

The comparison can be implemented using any suitable algorithm to determine if the fingerprint data matches a record of the user fingerprint information. For example, an algorithm can determine if an index of similarity between a pattern of the fingerprint in the collected fingerprint data and a record of one fingerprint pattern in the user fingerprint information reaches a preset threshold value.

If there is a matched result from the comparison, the controller can determine that the current user is a valid user of the display apparatus. In response to the matched result, the controller can control the display panel to perform a display function based on the sliding direction of the finger.

If there is no matched result from the comparison, the controller can determine that the current user is an invalid user of the display apparatus. In response to the unmatched result, the controller can control the display panel to maintain a non-display state.

In some embodiments, the display function can include a first display form and a second display form. The controller can control the display panel to perform the display function in the first display form if the sliding direction of the fingerprint is a first direction, and can control the display panel to perform the display function in the second display form when the sliding direction of the fingerprint is a second direction.

In some embodiments, two or more sliding directions of the fingerprint can be distinguished, and the two or more sliding directions of the fingerprint can correspond to two or more different display forms.

In some embodiments, the display panel has a substantially rectangle shape which includes a length side and a width side. The first direction can be substantially parallel to the length side of the display panel, and the second direction can be substantially parallel to the width side of the display panel. The first display form can include displaying in a wide-screen display type by using the length side of the display panel as a bottom side, and the second display form can include displaying in a narrow-screen display type by using the width side of the display panel as a bottom side.

Figure 2:
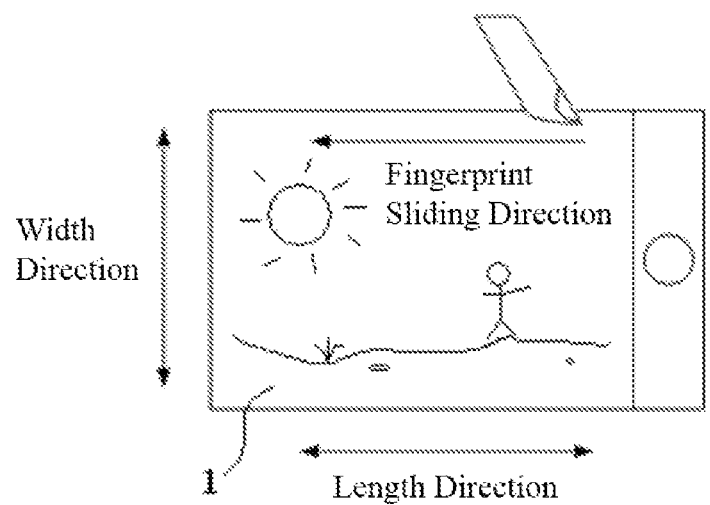
FIG. 2 is a schematic diagram of a display apparatus and a finger of a user that is sliding on the display apparatus along a length direction of the display apparatus in accordance with some embodiments of the disclosed subject matter.

As illustrated in FIG. 2, a schematic diagram of a display apparatus and a finger of a user that is sliding on the display apparatus along a length direction of the display apparatus is shown in accordance with some embodiments of the disclosed subject matter.

When the sliding direction of the fingerprint is a first direction, which means the user is sliding his finger along the direction that substantially parallel to the length side of the display panel, the controller can control the display panel to display in the wide-screen display type by using the length side of the display panel as a bottom side.

Figure 3:
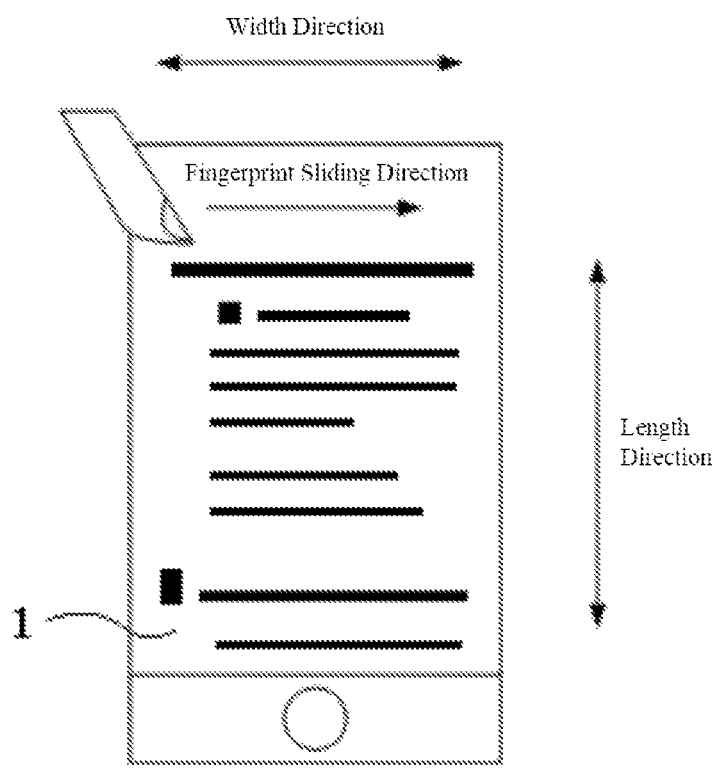
FIG. 3 is a schematic diagram of a display apparatus and a finger of a user that is sliding on the display apparatus along a width direction of the display apparatus in accordance with some embodiments of the disclosed subject matter.

As illustrated in FIG. 3, a schematic diagram of a display apparatus and a finger of a user that is sliding on the display apparatus along a width direction of the display apparatus is shown in accordance with some embodiments of the disclosed subject matter. When the sliding direction of the fingerprint is a second direction, which means the user is sliding his finger along the direction that substantially parallel to the width side of the display panel, the controller can control the display panel to display in the narrow-screen display type by using the width side of the display panel as a bottom side.

In some embodiments, the first display form can include displaying a first content item, and the second display form can include displaying a second content item that is different from the first content item. In some embodiments, the first content item includes at least one video type application, and the second content item includes at least one document type application.

That is, in different display type, the content displayed in the display panel can be different. When the display panel is displaying in the wide-screen display type, at least one video type application, such as a Youtube application, a Media Player application, etc. can be displayed. When the display panel is displaying in the narrow-screen display type, at least one document type application, such as a Word application, an Ebook Reader application, etc. can be displayed. It should be understood that, the applications mentioned herein can include not only one or more icons of the applications, but also application user interfaces, such as video pages, web pages, etc.

In some embodiments, the controller can retrieve user information associated with the fingerprint record, and control the display panel to perform the display function based on the sliding direction of the finger and the user information associated with the fingerprint record. The user information can include any suitable information that is related to the fingerprint record, such as a user account, a user preference setting, etc. In this case, the controller can log in different user accounts based on different identified fingerprints. For example, if the controller determined a fingerprint of user A is sling along a length direction of the display panel, a Youtube application can be displayed on the display panel.

As another example, the controller determined a fingerprint of user B is sling along a width direction of the display panel, a Word application can be displayed on the display panel. A user preference setting includes one or more association with different sling directions and different applications can be preset by a user.

In some embodiments, the disclosed display apparatus is a handheld display apparatus, such as a mobile phone, an electrical paper, an electrical book, a tablet computer, a digital frame, a navigator, etc. A handheld display apparatus is small and convenient to be carried by a user, and it is a suitable example of the display apparatus in accordance with the disclosed subject matter.

Another aspect of the disclosed subject matter provides a related display method. The method can include: recognizing, by a fingerprint recognition unit embedded in a display panel, current fingerprint data of a finger and determining a sliding direction of the finger when it is detected that the finger is sliding on the display panel; comparing, by a controller, the fingerprint data of the finger with user fingerprint information stored in a memory; and controlling, by the controller, the display panel to perform a display function based on the sliding direction of the finger in response to a matched result when the fingerprint data of the finger is consistent with a record of the user fingerprint information.

In some embodiments, the display function is performed in a first display form when it is determined that the sliding direction of the finger is a first direction, and the display function is performed in a second display form when it is determined that the sliding direction of the finger is a second direction.

In some embodiments, the display method can also include using the controller to retrieve user information associated with a first user based on the fingerprint data of the finger, and using the controller to control the display panel to perform the display function based on the sliding direction of the finger and the user information associated with the first user. The user fingerprint information is associated with a plurality of users. The plurality of user may include the first user associated with the record of the user fingerprint information.

The disclosed display method can be implemented by the disclosed display apparatus.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, a display apparatus and a related display method are provided.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A display apparatus, comprising:
   a display panel;
   a memory for storing user fingerprint information;
   at least one fingerprint recognition sensor within a unit embedded in the display panel and configured for recognizing current fingerprint data of a finger that is sliding on the display panel, and determining a sliding direction of the finger; and
   a controller coupled to the memory and the at least one fingerprint recognition sensor, and configured for:
      comparing the current fingerprint data of the finger with the user fingerprint information stored in the memory, and upon matching, controlling a display on the display panel based on the sliding direction of the finger,
      wherein controlling the display includes:
         retrieving user information associated with the user fingerprint information that matches the current fingerprint data, the user information including a user preference setting based on a correspondence of the sliding direction of the finger and application types including at least one media player application and at least one document type application,
         if the sliding direction of the finger is along a first direction, controlling the display panel in a first display form including a wide-screen display type by displaying the at least one media player application on the display panel with a length side of the display panel as a bottom side, and
         if the sliding direction of the finger is along a second direction, controlling the display panel in a second display form including a narrow-screen display type by displaying the at least one document type application on the display panel with a width side of the display panel as a bottom side.

2. The display apparatus of claim 1, wherein:
   the first direction is substantially parallel to the length side of the display panel; and
   the second direction is substantially parallel to the width side of the display panel.

3. The display apparatus of claim 1, wherein the user fingerprint information is associated with a plurality of users.

4. The display apparatus of claim 1, wherein the controller is configured for controlling the display panel in a third display form, if the sliding direction of the finger is a third direction.

5. The display apparatus of claim 1, wherein the at least one fingerprint recognition sensor comprises a plurality of fingerprint recognition sensors distributed in a plurality of pixels of the display panel.

6. A display method, comprising:
   recognizing, using at least one fingerprint recognition sensor within a unit embedded in a display panel, current fingerprint data of a finger and determining a sliding direction of the finger when the finger is sliding on the display panel;
   comparing, using a controller, the current fingerprint data of the finger with user fingerprint information stored in a memory; and
   controlling, using the controller, a display on the display panel based on the sliding direction of the finger upon the current fingerprint data of the finger matching the user fingerprint information,
   wherein controlling the display includes:
      retrieving user information associated with the user fingerprint information that matches the current fingerprint data, the user information including a user preference setting based on a correspondence of the sliding direction of the finger and application types including at least one media player application and at least one document type application,
      if the sliding direction of the finger is along a first direction, controlling the display panel in a first display form including a wide-screen display type by displaying the at least one media player application on the display panel with a length side of the display panel as a bottom side, and
      if the sliding direction of the finger is along a second direction, controlling the display panel in a second display form including a narrow-screen display type by displaying the at least one document type application on the display panel with a width side of the display panel as a bottom side.

7. The method of claim 6, wherein:
   the first direction is substantially parallel to the length side of the display panel; and
   the second direction is substantially parallel to the width side of the display panel.

8. The method of claim 6, wherein the user fingerprint information is associated with a plurality of users.

9. The method of claim 6, further comprising:
   controlling, using the controller, the display panel in a third display form, if the sliding direction of the finger is a third direction.

10. The method of claim 6, wherein the at least one fingerprint recognition sensor comprises a plurality of fingerprint recognition sensors distributed in a plurality of pixels of the display panel.

* * * * *